(12) United States Patent
Nayak et al.

(10) Patent No.: US 12,271,648 B2
(45) Date of Patent: Apr. 8, 2025

(54) CONTROLLING A DEVICE WITH AN INOPERABLE USER INTERFACE

(71) Applicant: QUALCOMM Incorporated, San Diego, CA (US)

(72) Inventors: Anwesha Nayak, Jajpur (IN); Greeshmalatha Vallury, Hyderabad (IN); Kiran Anil Chikodi, Belagavi (IN); Sreenivasa Reddy Yarram, Hyderabad (IN); Shashi Vardhan Konatham, Hyderabad (IN); Aminul Islam, Kharupetia (IN); Pankaj Mulchandani, Raipur (IN); Manjil Kumar Choudhury, Jharsuguda (IN); Vasavi Kancharla, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 18/170,011

(22) Filed: Feb. 16, 2023

(65) Prior Publication Data
US 2024/0281185 A1    Aug. 22, 2024

(51) Int. Cl.
*G06F 3/14* (2006.01)
*G06F 3/0484* (2022.01)
*H04L 9/40* (2022.01)
*G06F 3/0488* (2022.01)

(52) U.S. Cl.
CPC .............. *G06F 3/14* (2013.01); *G06F 3/0484* (2013.01); *H04L 63/0876* (2013.01); *G06F 3/0488* (2013.01)

(58) Field of Classification Search
CPC ........ G06F 3/14; G06F 3/0484; G06F 3/0488; G06F 21/70; H04L 63/0876; H04L 67/04; H04M 1/72448; H04M 1/72469; H04W 4/06; H04W 12/08; H04W 12/06
See application file for complete search history.

(56) References Cited

U.S. PATENT DOCUMENTS

| | | | |
|---|---|---|---|
| 9,696,882 B2 * | 7/2017 | Xiao | G06F 3/0484 |
| 2013/0019304 A1 * | 1/2013 | Cai | H04M 1/72463 726/16 |
| 2019/0318074 A1 * | 10/2019 | Ledwith | H04W 12/084 |
| 2021/0132756 A1 * | 5/2021 | Zhang | G06F 3/048 |

FOREIGN PATENT DOCUMENTS

| | | |
|---|---|---|
| CN | 114205364 A | 3/2022 |
| CN | 115580677 A | 1/2023 |

OTHER PUBLICATIONS

International Search Report and Written Opinion—PCT/US2024/010259—ISA/EPO—Apr. 16, 2024. 13 pages.

* cited by examiner

*Primary Examiner* — J. Brant Murphy
(74) *Attorney, Agent, or Firm* — Muncy, Geissler, Olds & Lowe, P.C.

(57) ABSTRACT

Methods for controlling a computing device with an inoperable user interface may include broadcasting, by the computing device, a request for another computing device to operate as a substitute user interface for the computing device in response to determining that a user interface of the computing device is inoperable to control an operation of the computing device, receiving from another computing device a message indicating that the other computing device can operate as the substitute user interface for the computing device, and enabling the computing device to respond to user instructions received from the other computing device.

29 Claims, 10 Drawing Sheets

CONTROLLING A DEVICE WITH AN INOPERABLE USER INTERFACE

BACKGROUND

Portable devices such as smartphones and laptops have become essential in everyday modern life. However, the portability of such devices also renders them vulnerable to damage from being dropped, sat on, abusive handling, crushed under another device, or other misadventure. Many smart phones and other devices combine a user interface and a display device, such as in a touchscreen display. Damage to such user interface may render the device incapable of both displaying information and receiving user inputs.

SUMMARY

Various aspects include methods that may be implemented on a processor of a computing device that may enable controlling such a computing device having an inoperable user interface. Various aspects may include broadcasting, by the computing device (a first computing device), a request for another computing device (a second computing device) to operate as a second or substitute user interface for the first computing device in response to determining that a first user interface of the computing device is inoperable to control an operation of the computing device, receiving from a second computing device a message indicating that the second computing device can operate as the second/substitute user interface for the first computing device, and enabling the first computing device to respond to user instructions received from the second computing device.

In some aspects, enabling the first computing device to respond to user instructions received from the second computing device may include transmitting to the second computing device information configured to be displayed by the second/substitute user interface of the second computing device, and performing an operation in response to receiving an input from the second computing device. Some aspects may include determining that the first user interface is inoperable in response to the first user interface failing an operational health check.

Some aspects may include performing an operation to authenticate the second computing device as a trusted device in response to receiving the message indicating that the second computing device can operate as the second user interface for the first computing device, in which enabling the second computing device to operate as a second/substitute user interface for the first computing device may be performed in response to successfully authenticating the second computing device as a trusted device. In some aspects, performing an operation to authenticate the second computing device as a trusted device may include determining whether an indication that the second computing device is a trusted device is stored in a memory of the first computing device.

In some aspects, performing an operation to authenticate the second computing device in response to receiving the authentication request may include transmitting to the second computing device an authentication information request, receiving from the second computing device authentication information responsive to the authentication information request, and using the received authentication information to perform the operation to authenticate the second computing device. In some aspects, enabling the first computing device to respond to user instructions received from the second computing device may include enabling instructions received from the second computing device to assert administrative-level control of the first computing device. In some aspects, the first computing device and the second computing device may be network elements of a distributed context network. In some aspects, enabling instructions received from the second computing device to assert administrative-level control of the first computing device may include setting administrative-level access by the second computing device as a priority rule in a data structure in memory.

Further aspects may include a processor for use in a computing device configured to perform operations of any of the methods summarized above. Further aspects may include a computing device including means for performing functions of any of the methods summarized above. Further aspects may include a computing device configured with processor-executable instructions to perform operations of any of the methods summarized above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of various embodiments.

DETAILED DESCRIPTION

Figure 1:
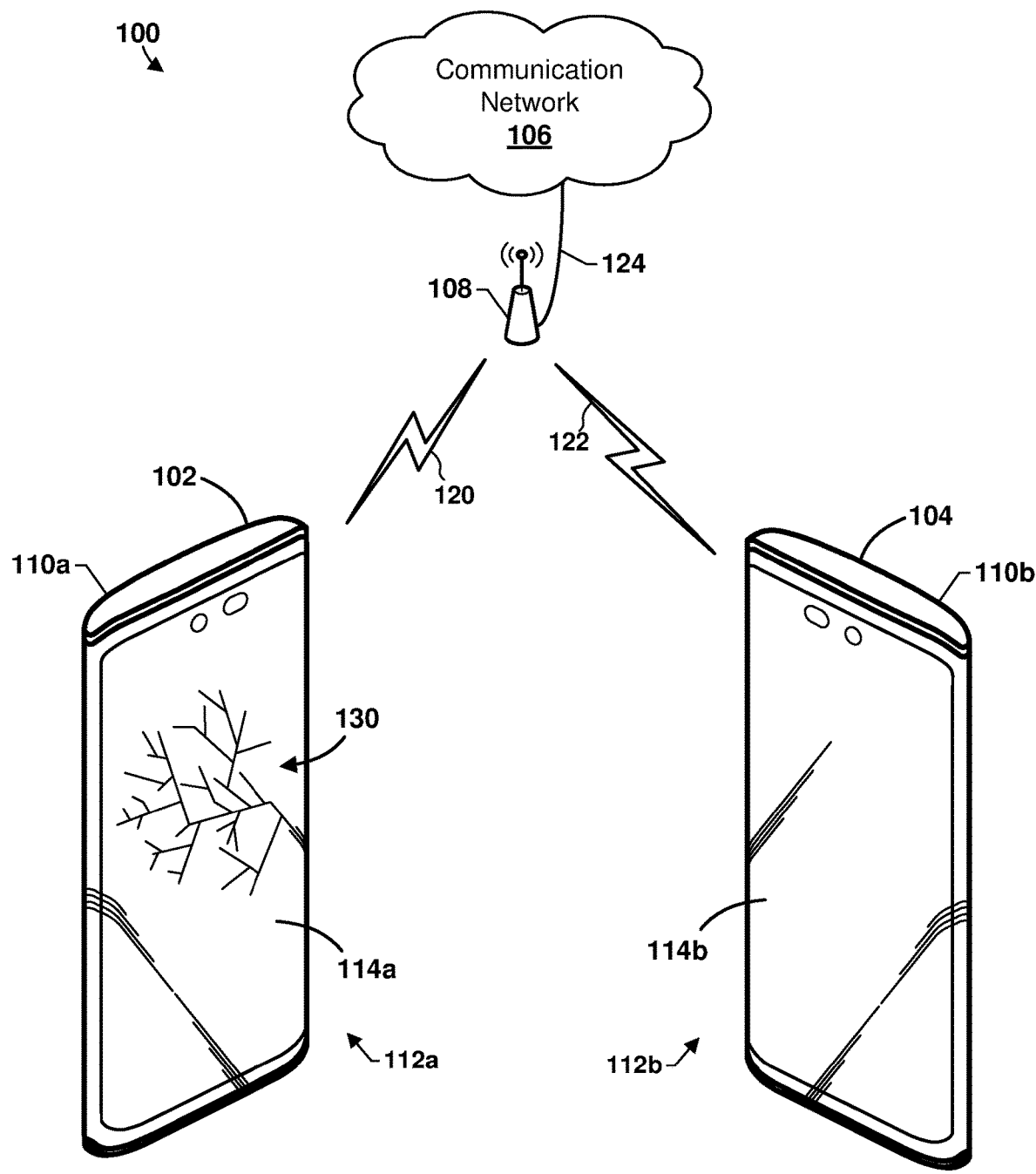
FIG. 1 is a system block diagram illustrating an example communications system suitable for implementing various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments include methods that may be implemented on a processor of a computing device that may enable control of the computing device in a situation in which a user interface of the computing device is inoperable. Various embodiments enable the performance of operations on a device having an inoperable user interface, such as one or more computing operations, access to functionality of the computing device, retrieval of data stored in a memory of the computing device, or other operations.

As used herein, the term "computing device" refers to an electronic device equipped with at least a processor, memory, and wireless communication devices such as a transceiver and antenna configured to enable communication with wireless communication devices and networks. A computing device may include any one or all of smart glasses, augmented/virtual reality devices, cellular telephones, smartphones, portable computing devices, personal or mobile multi-media players, laptop computers, tablet computers, 2-in-1 laptop/table computers, smart-books, ultrabooks, multimedia Internet-enabled cellular telephones, wearable devices including smart-watches and smart-contact lenses, entertainment devices (e.g., wireless gaming controllers, music and video players, satellite radios, etc.), and similar electronic devices that include a memory, wireless communication components and a programmable processor. As used herein, the term "smart" in conjunction with a device, refers to a device that includes a processor for automatic operation, for collecting and/or processing of data, and/or may be programmed to perform all or a portion of the operations described with regard to various embodiments. For example, a smart-phone, smart-glasses, smart-contact lenses, smart-watch, smart-ring, smart-necklace, smart-cup, smart-straw, smart-appliances, etc.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "component," "system," "unit," "module," and the like include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

Portable computing devices such as smartphones and laptops enable access to communication networks and services, store contact information, calendar information, photographs, and messages, enable access to financial accounts and services, streaming services, online games, and a wide array of other services. Portable computing devices also may be used to store access tokens, electronic credentials, keys, or other electronic information required to access one or more services. As such, these types of portable devices have become essential in modern life. However, their portability also makes such devices vulnerable to damage. In some cases, smart phones, laptops, and other similar devices combine a display device and a user interface, such as in a touchscreen display. Should a touchscreen display become inoperable, the device may be unable to display information or to receive user inputs, even when other functions of the computing device remain operable or functional. The inability to access photographs, audio recordings, or other similar information may be inconvenient and upsetting. The loss of electronic access credentials for services related to one's work, financial services and bank accounts, or other suitable access credentials, such as may be stored in software and/or hardware, may have far more serious ramifications.

Various embodiments may include a method of controlling a computing device (sometimes referred to herein as a "first computing device" for clarity) with an inoperable user interface. Various embodiments may include broadcasting, by the first computing device, a request for another computing device (referred to herein as "the other computing device" or "the second computing device") to operate as a second or substitute user interface for the first computing device in response to determining that a user interface (sometimes referred to as a "first user interface" for clarity) of the computing device is inoperable to control an operation of the computing device, receiving from another (i.e., second) computing device a message indicating that the second computing device can operate as the second or substitute user interface for the first computing device, and enabling the first computing device to respond to user instructions received from the second computing device. In some embodiments, enabling the first computing device to respond to user instructions received from the second computing device may include enabling instructions received from the second computing device to assert administrative-level control of the first computing device.

In some embodiments, the first computing device and the second computing device may communicate via a local communication network. In some embodiments, such local communication network may include a plurality of wireless devices, such as the first computing device and the second computing device, that share context information, access to functionality or information, or other features or functionality, and may provide sufficient communication infrastructure to enable commands issued by the second computing device to control functions of or access information on the first computing device. In some embodiments, such a network may include a "distributed context network."

In some embodiments, the first computing device may transmit to the second computing device information that is configured to be displayed by the second or substitute user interface of the second computing device. In such embodiments, the first computing device may perform an operation in response to receiving an input from the second computing device. In some embodiments, the information that is configured to be displayed by the second user or substitute interface may include information that would be (or is also) sent or conveyed to the inoperable first user interface. In some embodiments, the information that is configured to be displayed by the second or substitute user interface may include an indication of one or more available functions or commands. In some embodiments, the information that is configured to be displayed by the second or substitute user interface may include a simplified menu of choices of features and/or functionality of the first computing device, such as may be designed to function as an "emergency access menu" or another suitable menu of features or functions of the first computing device.

In some embodiments, the first computing device may perform an operation to determine whether the first user interface is inoperable. For example, the first computing device may perform an operational health check (or another suitable analysis) of one or more functions of the first user interface. In some embodiments, the first computing device may broadcast the request for another device to operate as a second user interface in response to determining that a first user interface of the computing device is inoperable to control an operation of the computing device.

The first computing device may perform a security or authentication operation to determine whether to permit the second computing device to operate features or functions of the first computing device. In some embodiments, the first computing device may perform an operation to authenticate the second computing device as a trusted device in response to receiving the message indicating that the second computing device can operate as the second or substitute user interface for the first computing device. In some embodiments, in response to successfully authenticating the second computing device as a trusted device, the first computing device may enable the second computing device to operate as a second or substitute user interface for the first computing device. In some embodiments, the first computing device may determine whether an indication that the second computing device is a trusted device is stored in a memory of the first computing device. For example, the first computing device may be configured to communicate via, or operate as an element of, a distributed context network. In some embodiments, computing devices that participate in a distributed context network may transmit information about features, functionality, identity, and/or other information to other computing devices participating in the distributed context network. In such embodiments, the first computing device may have previously received from the second computing device authentication information, a token, a credential, or other information identifying the second computing device as a trusted device, which the first computing device may store in memory. In such embodiments, the first computing device may automatically identify a second computing device as a trusted device in response to receiving a message indicating that the second computing device can operate as the second user interface for the first computing device.

However, the first computing device may not have stored information indicating that the second computing device is a trusted device. In some embodiments, the first computing device may receive an authentication request from the computing device. In such embodiments, the first computing device may perform an operation to authenticate the second computing device in response to receiving the authentication request. In some embodiments, the first computing device may transmit to the second computing device authentication information request. The first computing device may receive from the second computing device authentication information responsive to the authentication information request. The first computing device may use the received authentication information to perform the operation to authenticate the second computing device.

As one example of an application of the various embodiments, the first computing device may establish communication with a communication network (such as the distributed context network) including at least one other communication device. From time to time, the first computing device may broadcast context information to the other computing device(s) in the communication network, and also may receive context information from the other computing device(s). Also from time to time, the computing device may perform an analysis of the operational health functionality of the first user interface. For example, the computing device may obtain information available from or through a device service such as, for example, the Android operating system SurfaceFlinger service or other process or service that may access or provide such information. In some embodiments, the computing device may perform the user interface health analysis when the first user interface powers up from a sleep or low-power mode, or when the computing device is powered on or restarted.

In response to detecting that the user interface of the computing device is inoperable to control an operation of the computing device, the computing device may broadcast a request (an alert, a message) to the other computing device(s) in the communication network requesting that another device operate as a second or substitute user interface for the computing device. The computing device may receive a message from another computing device (a second computing device) in the communication network indicating that the second computing device is able to operate as the second or substitute user interface for the requesting computing device. In some embodiments, the first computing device may perform a security operation to verify that the second computing device is a trusted device (for example, the first computing device can authenticate or authorize the second computing device).

The first computing device may perform operations to enable itself to respond to instructions or commands, such as user instructions, received from the second computing device (for example, inputs received by the user interface of the second computing device). In some embodiments, the message received from the second computing device may include a pairing request, and the first computing device may automatically accept the pairing request in response to determining that the second computing device is a trusted computing device. In some embodiments, the first computing device may automatically accept the pairing request in response to determining that the first computing device is connected to a known network, such as a network designated as a home network, a trusted network, or the like. In some embodiments, if the first computing device is not connected to a trusted network, the first computing device may require a security operation before authorizing access by the second computing device. In some embodiments, enabling the first computing device to respond to instructions received from the second computing device may include the first computing device providing administrative-level access by the second computing device to functions of the first computing device. In some embodiments, the first computing device may grant (process, handle) priority to the administrative-level access by the second computing device over other processes executing in the first computing device. For example, the first computing device may set the administrative-level access by the second computing device as a priority rule in a data structure in memory.

Various embodiments improve the utility and effectiveness of operations of computing devices by enabling functions of, and information stored in, a computing device with an inoperable user interface to be operated or accessed by the user interface of a second computing device. Various embodiments enable the operation of or access to data or services that require authentication codes or credentials, which may be input to the second computing device's user interface. Various embodiments may be used with nearly any type of portable computing device, and are not limited to a particular operating system or device manufacturer.

FIG. 1 is a system block diagram illustrating an example communications system 100 suitable for implementing various embodiments. The communication system 100 may include a first computing device 102, a second computing device 104, and a communication network 106.

The computing devices 102 and 104 may each include a body 110a, 110b having a front area 112a, 112b. The front area 112a, 112b may include a display 114a, 114b that incorporates a touch sensor device to form a touchscreen display that may be configured to function as a user interface. In some embodiments, touch sensor may be configured to detect a change in capacitance at a location where the sensor is touched (or nearly touched) by an object, particularly be a user's hand, thumb or fingers. Such change in capacitance may be processed by a processor of the computing device 102, 104 as an input, such as a selection, a command, and the like. The computing devices 102, 104 may include radio frequency (RF) circuitry and an antenna to enable wireless communication via a wireless communication link 120, 122. The computing devices 102, 104 may communicate with an access point 108 that may support wireless communication, for example, between the computing devices 102 and 104, or with the communication network 106 via a communication link 124.

The touchscreen display 114a of the computing device 102 may become inoperable due to a variety of causes, such as hardware or software failure, damage 130 to the touchscreen display 114a, or another reason. In some embodiments, the computing device 102 may determine that the user interface is inoperable, and may broadcast a request for another device, such as computing device 104, to operate as a second or substitute user interface for the computing device 102. The computing device 102 may receive from the computing device 104 a message, for example, via the access point 108 and/or the communication network 106, indicating that the computing device 104 can operate as the second or substitute user interface for the computing device 102. A processor of the computing device 102 may perform operations to enable the computing device 102 to respond to user instructions received from the second computing device 104, as further described below.

Figure 2:
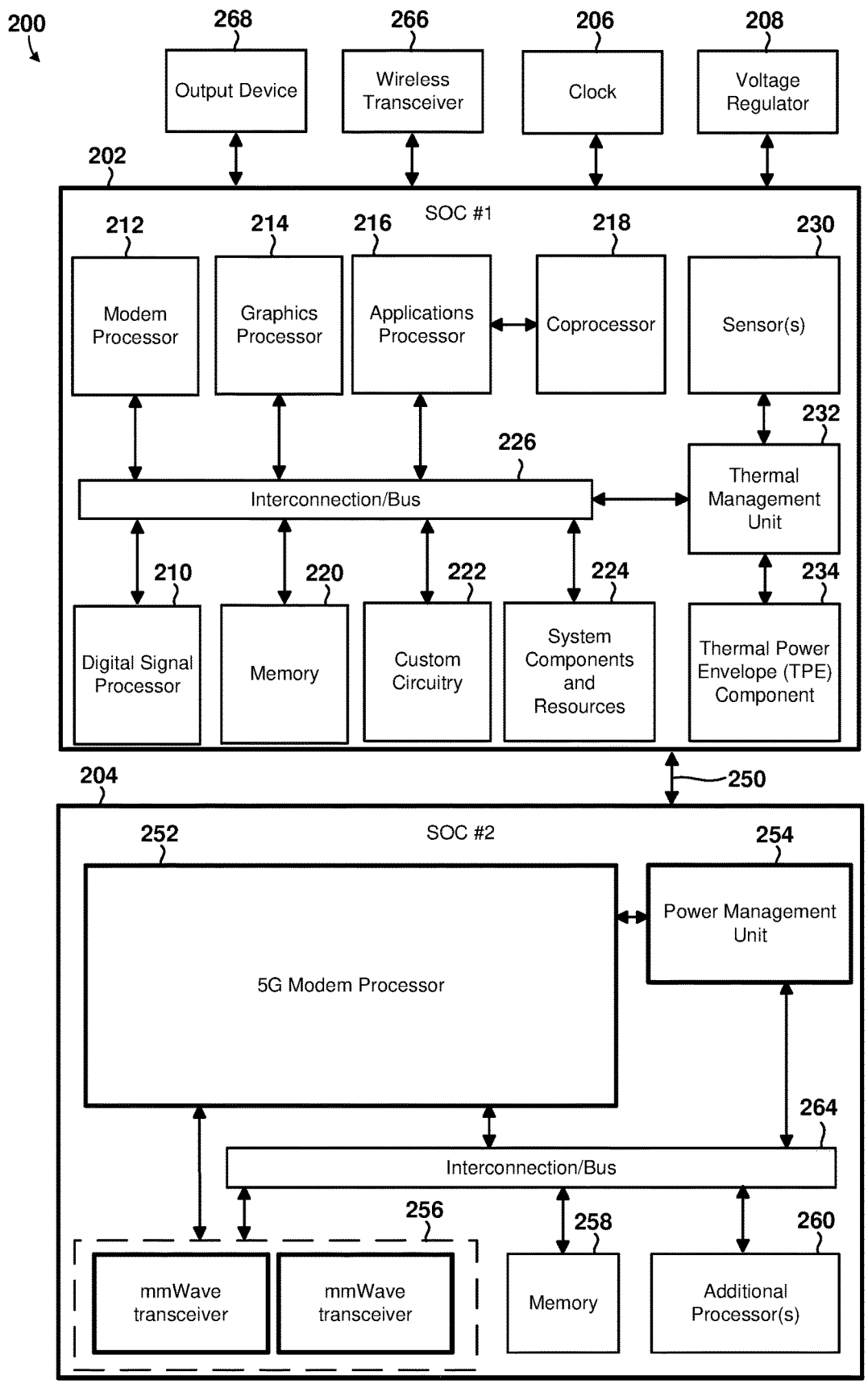
FIG. 2 is a component block diagram illustrating an example computing system including a wireless modem suitable for implementing various embodiments.

FIG. 2 is a component block diagram illustrating an example computing system 200 including a wireless modem suitable for implementing various embodiments. With reference to FIGS. 1 and 2, the illustrated example processing system 200 includes two SOCs 202, 204, a clock 206, a voltage regulator 208, a wireless transceiver 266, and a an output device 268 such as a display device, a sound output device (e.g., a speaker), a haptic feedback device, etc. In some embodiments, the first SOC 202 operates as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz millimeter wave (mmWave) spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more sensors 230 (e.g., thermal sensors, motion sensors, proximity sensors, a multimeter, etc.), a thermal management unit 232, and a thermal power envelope (TPE) component 234. The second SOC 204 may include a 5G modem processor 252, a power management unit 254, an interconnection/bus module 264, memory 258, and various additional processors 260, such as an applications processor, packet processor, etc. The second SOC 204 may further be coupled to a plurality of mm Wave transceivers 256, which may be separate integrated circuits that are radio frequency shielded on or packaged separate from the second SOC 204 as indicated by the dashed line.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mm Wave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example processing system 200 discussed above, various embodiments may be implemented in a wide variety of computing systems, which may include a single processor, multiple processors, multicore processors, or any combination thereof. In some embodiments, only one SOC (e.g., 202, 204) may be used in a less capable computing device that are configured to provide sensor information to a more capable computing device, such as a computing device 102, 140.

Figure 3:
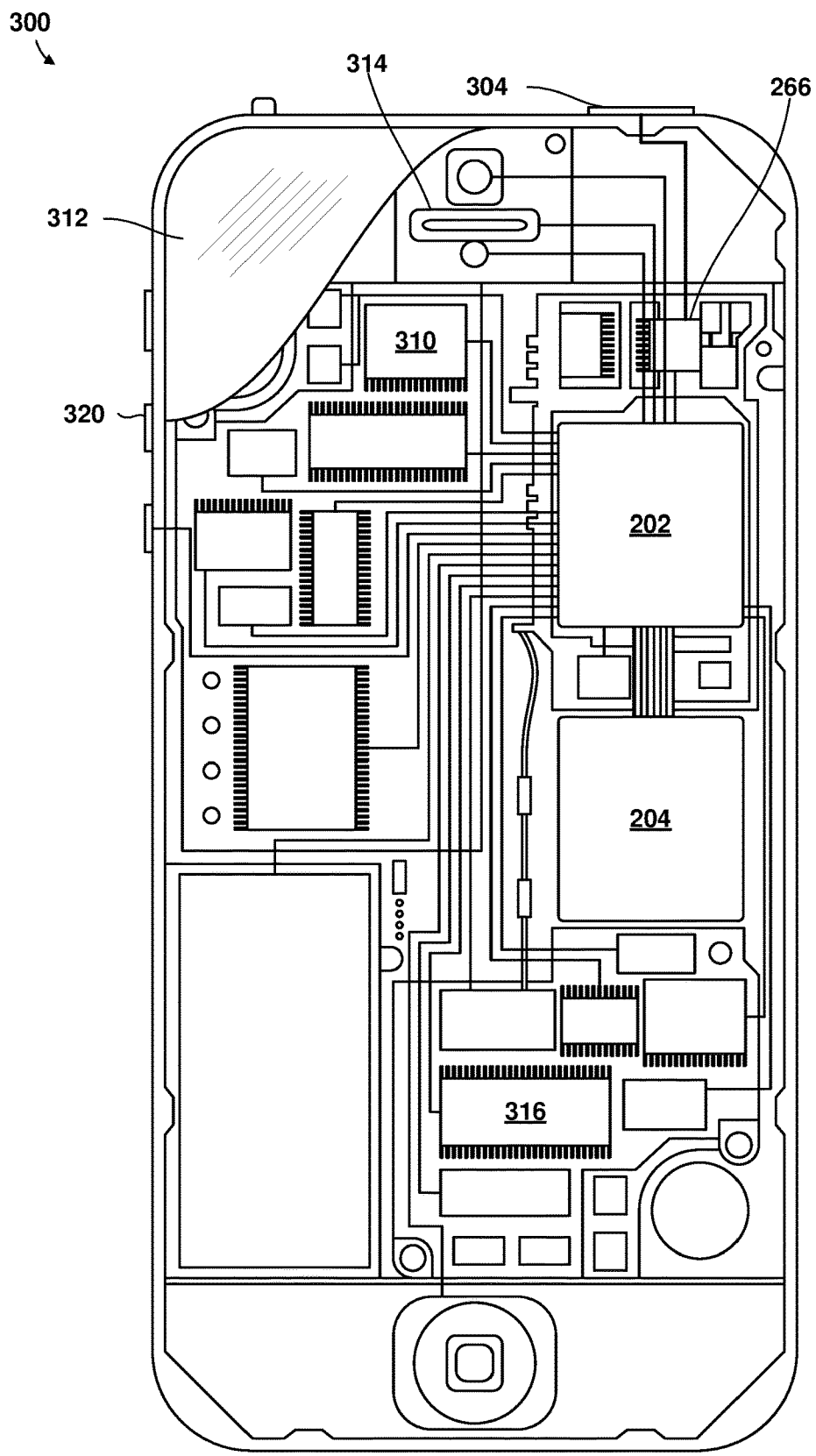
FIG. 3 is a component block diagram of a computing device suitable for use with various embodiments.

FIG. 3 is a component block diagram of a computing device 300 suitable for use with various embodiments. With reference to FIGS. 1A-3, the computing device 300 (e.g., 100a-100e, 300, 402, 422, and 442) may be configured to perform the operations of the methods and operations 400a-500d in various embodiments.

The computing device 300 may include a first SOC 202 (e.g., a SOC-CPU) coupled to a second SOC 204 (e.g., a 5G capable SOC). The first and second SOCs 202, 204 may be coupled to internal memory 316, a display 312, and to a speaker 314. Additionally, the computing device 300 may include an antenna 304 for sending and receiving electromagnetic radiation that may be connected to a wireless data link and/or cellular telephone transceiver 266 coupled to one or more processors in the first and/or second SOCs 202, 204. The computing device 300 may also include menu selection buttons or rocker switches 320 for receiving user inputs.

The computing device 300 also may include a sound encoding/decoding (CODEC) circuit 310, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 310 may include a digital signal processor (DSP) circuit (not shown separately).

The processors of the computing device 300 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Software applications may be stored in the memory 316 before they are accessed and loaded into the processor. The processors may include internal memory sufficient to store the application software instructions.

Figure 4:
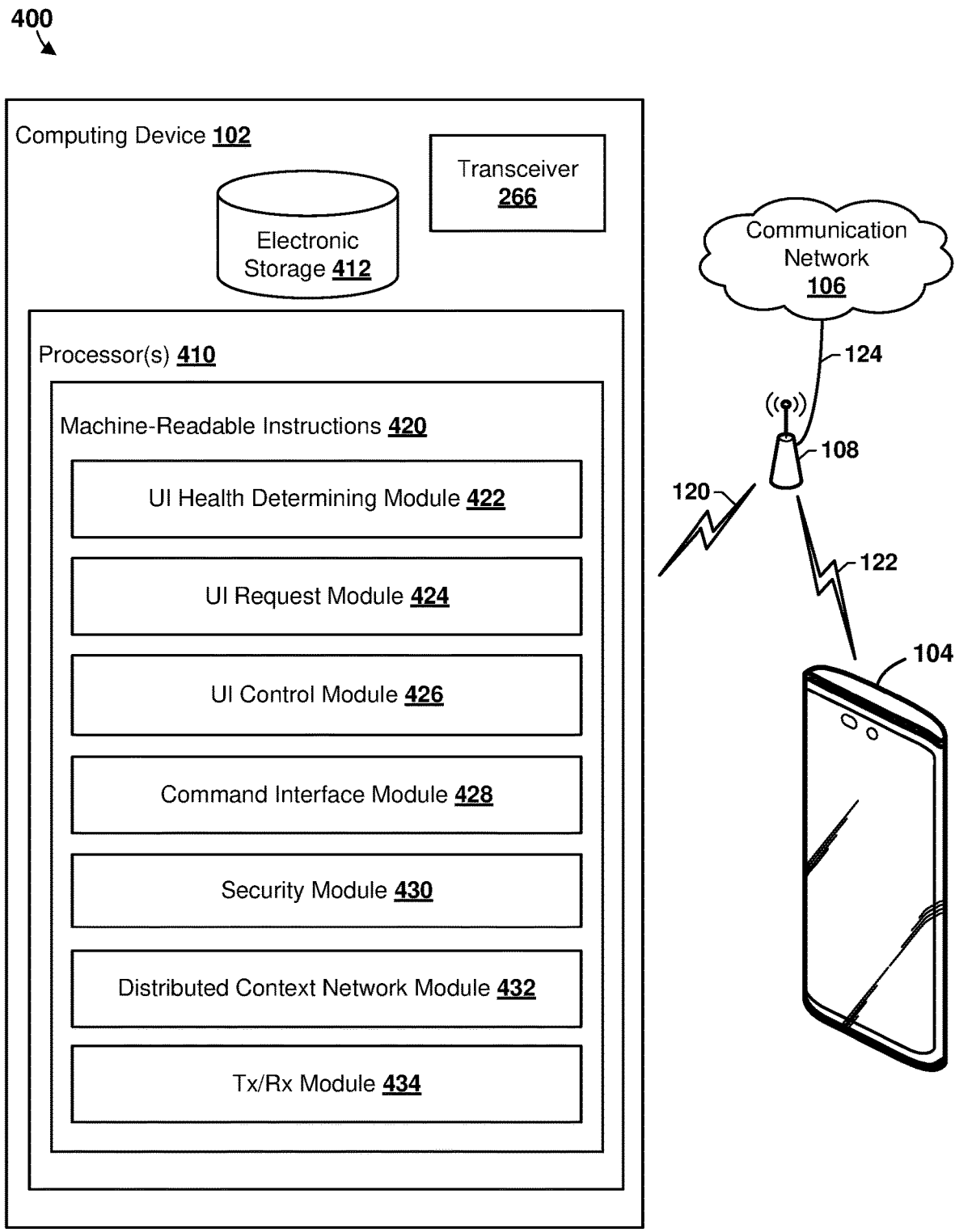
FIG. 4 is a component block diagram illustrating a system configured to enable control of a first computing device with an inoperable user interface in accordance with various embodiments.

FIG. 4 is a component block diagram illustrating a system 400 configured to enable control of a first computing device with an inoperable user interface in accordance with various embodiments. With reference to FIGS. 1-4, the system 400 may include a computing device 102, computing device 104, communication network 106, and access point 108.

The computing device 102 may include one or more processors 410, electronic storage 412, a transceiver 266 (e.g., wireless transceiver), and other components. The computing device 102 may include a plurality of hardware, software, and/or firmware components operating together to provide the functionality attributed herein to the computing device 102.

Electronic storage 412 may include non-transitory storage media that electronically stores information. The electronic storage media of electronic storage 412 may include one or both of system storage that is provided integrally (i.e., substantially non-removable) with the computing device 102 and/or removable storage that is removably connectable to the computing device 102 via, for example, a port (e.g., a universal serial bus (USB) port, a firewire port, etc.) or a drive (e.g., a disk drive, etc.). In various embodiments, electronic storage 412 may include one or more of electrical charge-based storage media (e.g., EEPROM, RAM, etc.), solid-state storage media (e.g., flash drive, etc.), optically readable storage media (e.g., optical disks, etc.), magnetically readable storage media (e.g., magnetic tape, magnetic hard drive, floppy drive, etc.), and/or other electronically readable storage media. Electronic storage 412 may include one or more virtual storage resources (e.g., cloud storage, a virtual private network, and/or other virtual storage resources). Electronic storage 412 may store software algorithms, information determined by processor(s) 410, information received from the computing device 140, information received from network element 110, and/or other information that enables the computing device 102 to function as described herein.

Processor(s) 410 may include one of more local processors (e.g., 210, 212, 214, 216, 218, 260), which may be configured to provide information processing capabilities in the computing device 102. As such, processor(s) 410 may include one or more of a digital processor, an analog processor, a digital circuit designed to process information, an analog circuit designed to process information, a state machine, and/or other mechanisms for electronically processing information.

Although processor(s) 410 is shown in FIG. 4 as a single entity, this is for illustrative purposes only. In some embodiments, processor(s) 410 may include a plurality of processing units. These processing units may be physically located within the same device, or processor(s) 410 may represent processing functionality of a plurality of devices operating in coordination.

The computing device 102 may be configured by machine-readable instructions 420, which may include one or more instruction modules. The instruction modules may include computer program modules. In various embodiments, the instruction modules may include one or more of a user interface (UI) health determining module 422, a UI request module 424, a UI control module 426, a command interface module 428, a security module 430, a distributed context network module 432, and a transmit/receive (Tx/Rx) module 434.

The UI health determining module 422 may be configured to determine whether a user interface (e.g., 144a) of the computing device is inoperable to control an operation of the computing device. The UI health determining module 422 may be configured to determine whether the first user interface is inoperable in response to the first user interface failing an operational health check.

The UI request module 424 may be configured to broadcast a request for another device to operate as a second user interface for the first computing device in response to determining (e.g., by the UI health determining module 422) that the first user interface of the computing device is inoperable to control an operation of the computing device.

The UI control module 426 may be configured to receive from a second computing device (e.g., 104) a message indicating that the second computing device can operate as the second or substitute user interface for the first computing device. The UI control module 426 may be configured to enable the first computing device to respond to user instructions received from the second computing device. In some embodiments, enabling the first computing device to respond to user instructions received from the second computing device may include enabling instructions received from the second computing device to assert administrative-level control of the first computing device.

The command interface module 428 may be configured to transmit to the second computing device information configured to be displayed by the second or substitute user interface of the second computing device. The command interface module 428 may be configured to perform an operation in response to receiving an input from the second computing device.

The security module 430 may be configured to perform an operation to authenticate the second computing device as a trusted device in response to receiving the message indicating that the second computing device can operate as the second or substitute user interface for the first computing device. The security module 430 may be configured to determine whether an indication that the second computing device is a trusted device is stored in a memory of the first computing device. In some embodiments, performing an operation to authenticate the second computing device as a trusted device may include receiving an authentication request from the second computing device, in which the operation to authenticate the second computing device is performed in response to receiving the authentication request. In some embodiments, performing an operation to authenticate the second computing device in response to receiving the authentication request may include transmitting to the second computing device an authentication information request, receiving from the second computing device authentication information responsive to the authentication information request, and using the received authentication information to perform the operation to authenticate the second computing device.

The distributed context network module 432 may be configured to store in the electronic storage 412 an indication that the second computing device is a trusted device. The distributed context network module 432 may be configured to transmit or broadcast information about features, functions, or operations of the computing device 102. The distributed context network module 432 may be configured to receive information about features, functions, or operations of other computing devices, such as the second computing device 104.

The transmit/receive (Tx/Rx) module 434 may be configured to manage or control communication operations performed by the computing device one or two, such as via the transceiver 266.

The processor(s) 410 may be configured to execute the modules 422-434 and/or other modules by software, hardware, firmware, some combination of software, hardware, and/or firmware, and/or other mechanisms for configuring processing capabilities on processor(s) 410. The description of the functionality provided by the different modules 422-434 is for illustrative purposes, and is not intended to be limiting, as any of modules 422-434 may provide more or less functionality than is described. For example, one or more of modules 422-434 may be eliminated, and some or all of its functionality may be provided by other ones of modules 422-434. As another example, processor(s) 410 may be configured to execute one or more additional modules that may perform some or all of the functionality attributed below to one of modules 422-434.

Figure 5A:
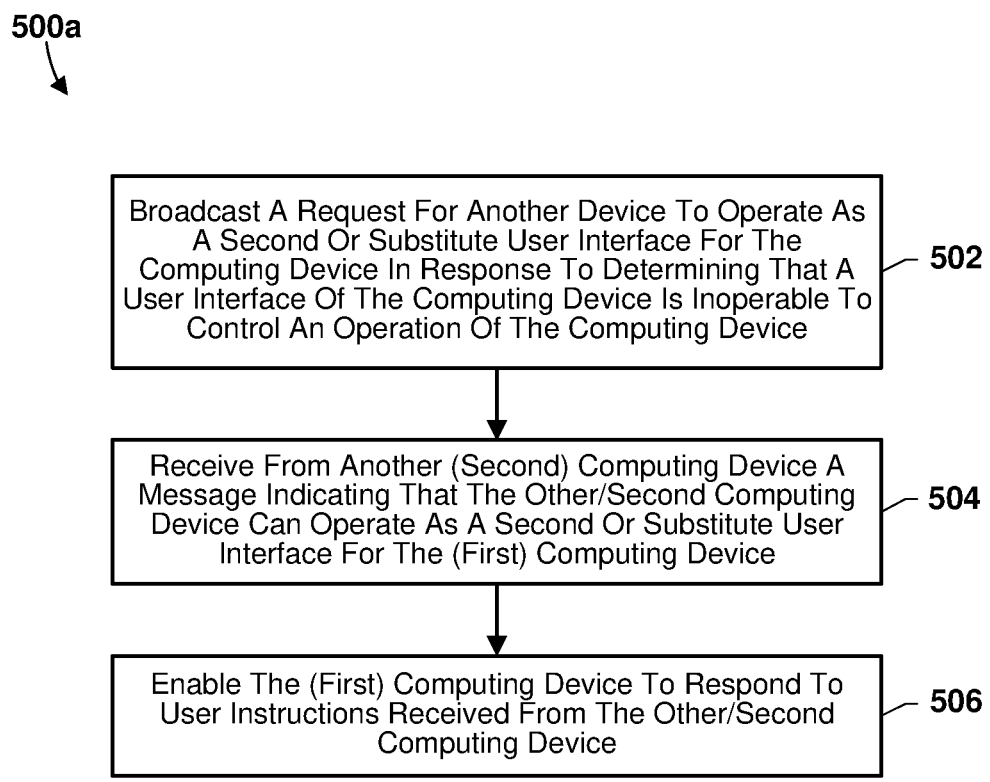
FIG. 5A is a process flow diagram illustrating an example method that may be performed by a processing device of a computing device for controlling the computing device with an inoperable user interface in accordance with various embodiments.

FIG. 5A is a process flow diagram illustrating an example method 500*a* that may be performed by a processing device of a computing device for controlling first computing device with an inoperable user interface in accordance with various embodiments. With reference to FIGS. 1-5A, means for performing each of the operations of the method 500*a* may include a processor (e.g., 202, 204, 210, 212, 214, 216, 218, 260, 410) of the computing device (e.g., 102), referred to herein a "processor."

In block 502, the processor may broadcast a request for another device to operate as a second user interface for the first computing device in response to determining that a first user interface of the computing device is inoperable to control an operation of the computing device. Means for performing the operations of block 502 include a processor (e.g., 202, 204, 210, 212, 214, 216, 218, 260, 410) executing the UI health determining module 422 and the UI request module 424.

In block 504, the processor may receive from a second computing device a message indicating that the second computing device can operate as the second or substitute user interface for the first computing device. In some embodiments, the first computing device and the second computing device may be network elements of a distributed context network. Means for performing the operations of block 502 include a processor (e.g., 202, 204, 210, 212, 214, 216, 218, 260, 410) executing the UI control module 426.

In block 506, the processor may enable the first computing device to respond to user instructions received from the second computing device. In some embodiments, enabling the first computing device to respond to user instructions received from the second computing device may include enabling instructions received from the second computing device to assert administrative-level control of the first computing device. Means for performing the operations of block 502 include a processor (e.g., 202, 204, 210, 212, 214, 216, 218, 260, 410) executing the UI control module 426 and the command interface module 428.

FIGS. 5B-5E are process flow diagrams illustrating example operations 500*b*-500*e* that may be performed by a processing device of a computing device as part of the method 500*a* for controlling first computing device with an inoperable user interface in accordance with various embodiments. With reference to FIGS. 1-5E, means for performing each of the operations 500*b*-500*e* may include a processor (e.g., 202, 204, 210, 212, 214, 216, 218, 260, 410) of the computing device (e.g., 102), referred to herein as a "processor."

Figure 5B:
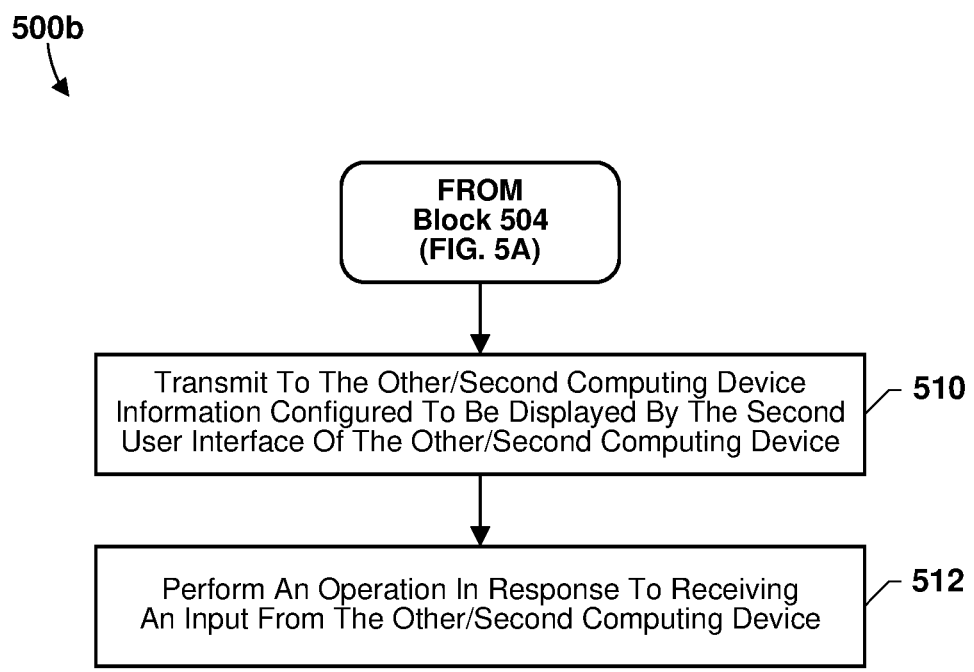
FIGS. 5B-5E are process flow diagrams illustrating example operations that may be performed by a processing device of a computing device as part of the method for controlling first computing device with an inoperable user interface in accordance with various embodiments.

Referring to FIG. 5B, after enabling the first computing device to respond to user instructions received from the second computing device in block 504 of the method 500*a*, the processor may transmit to the second computing device information configured to be displayed by the second user interface of the second computing device in block 510.

Means for performing the operations of block 510 include a processor (e.g., 202, 204, 210, 212, 214, 216, 218, 260, 410) executing the command interface module 428.

In block 512, the processor may perform an operation in response to receiving an input from the second computing device. Means for performing the operations of block 502 include a processor (e.g., 202, 204, 210, 212, 214, 216, 218, 260, 410) executing the command interface module 428.

Figure 5C:
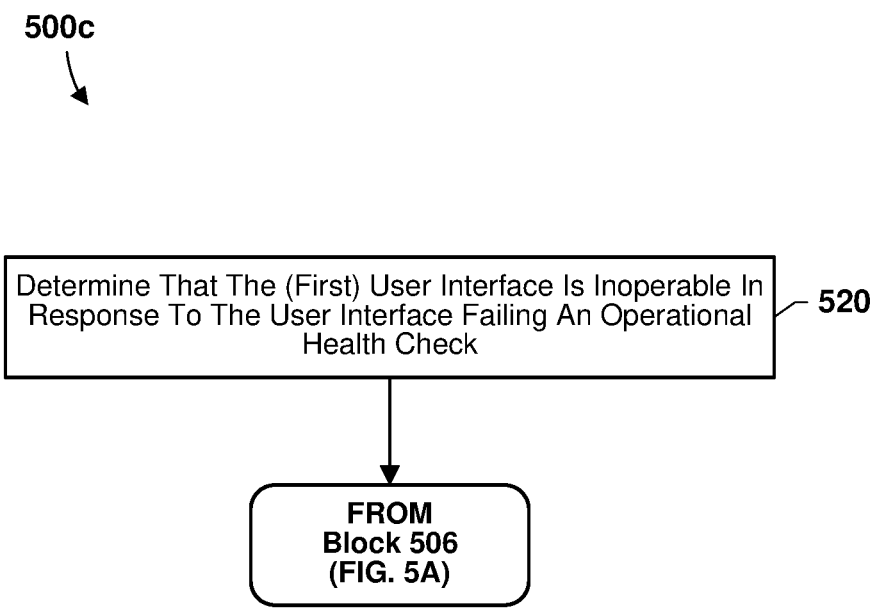

Referring to FIG. 5C, in block 520, the processor may determine that the first user interface is inoperable in response to the first user interface failing an operational health check.

The processor may enable the first computing device to respond to user instructions received from the second computing device in block 506 of the method 500a as described.

Figure 5D:
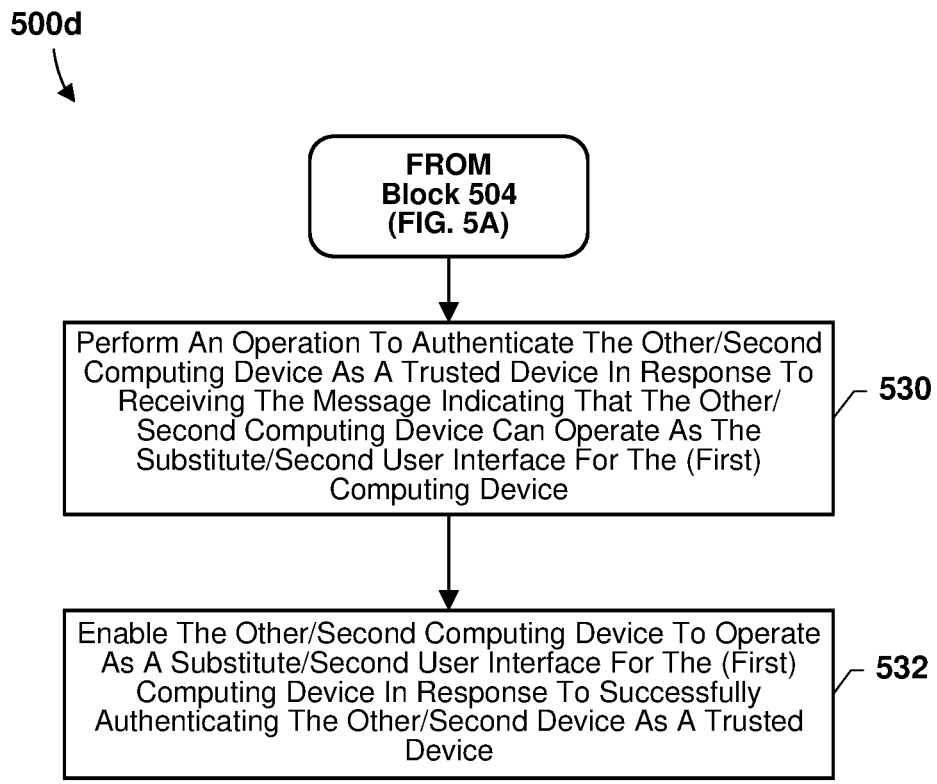

Referring to FIG. 5D, after receiving from the second computing device the message indicating that the second computing device can operate as the second or substitute user interface for the first computing device in block 504 of the method 500a as described, the processor may perform an operation to authenticate the second computing device as a trusted device in response to receiving the message indicating that the second computing device can operate as the second or substitute user interface for the first computing device in block 530. In some embodiments, the processor may determine whether an indication that the second computing device is a trusted device is stored in a memory of the first computing device. Means for performing the operations of block 530 include a processor (e.g., 202, 204, 210, 212, 214, 216, 218, 260, 410) executing the security module 430.

In block 532, the processor may enable the second computing device to operate as a second or substitute user interface for the first computing device in response to successfully authenticating the second computing device as a trusted device. Means for performing the operations of block 530 include a processor (e.g., 202, 204, 210, 212, 214, 216, 218, 260, 410) executing the UI control module 426.

Figure 5E:
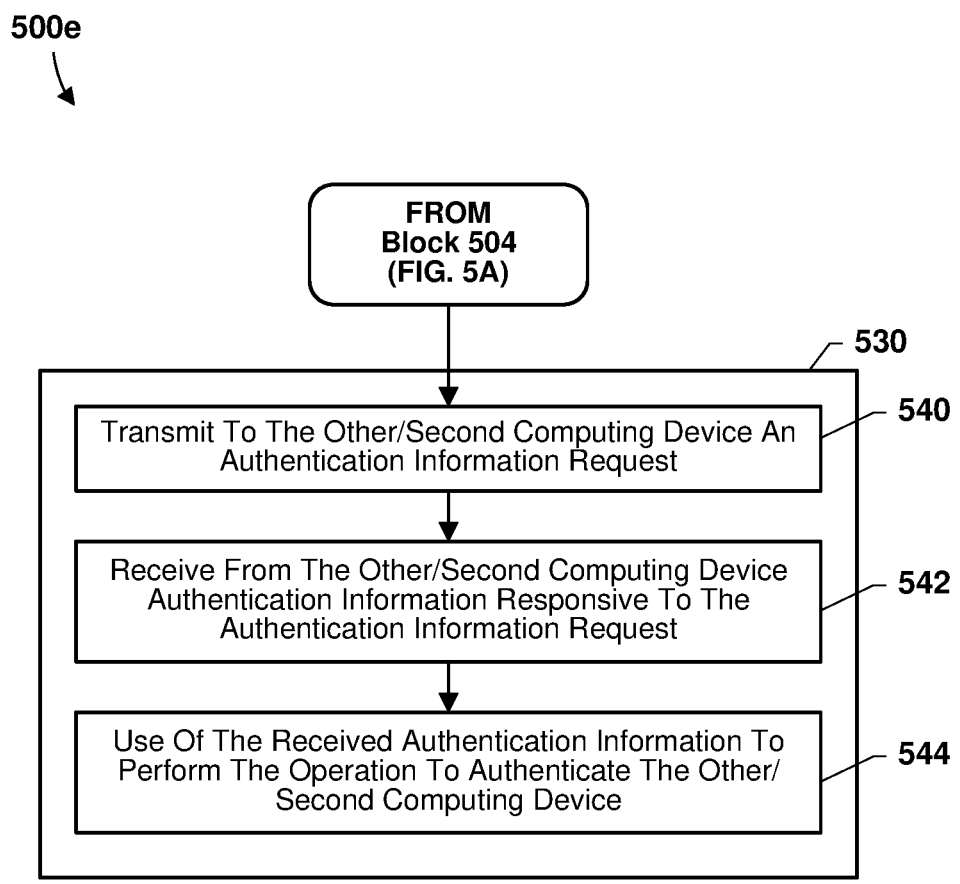

Referring to FIG. 5E, in some embodiments, as part of performing an operation to authenticate the second computing device as a trusted device in block 530 as described, the processor may transmit to the second computing device an authentication information request in block 540. Means for performing the operations of block 540 include a processor (e.g., 202, 204, 210, 212, 214, 216, 218, 260, 410) executing the security module 430.

In block 542, in response to receiving the authentication request, the processor may perform the operations to authenticate the second computing device. Means for performing the operations of block 542 include a processor (e.g., 202, 204, 210, 212, 214, 216, 218, 260, 410) executing the security module 430.

In block 544, the processor may use the received authentication information to perform the operations to authenticate the second computing device. Means for performing the operations of block 544 include a processor (e.g., 202, 204, 210, 212, 214, 216, 218, 260, 410) executing the security module 430.

Figure 6:
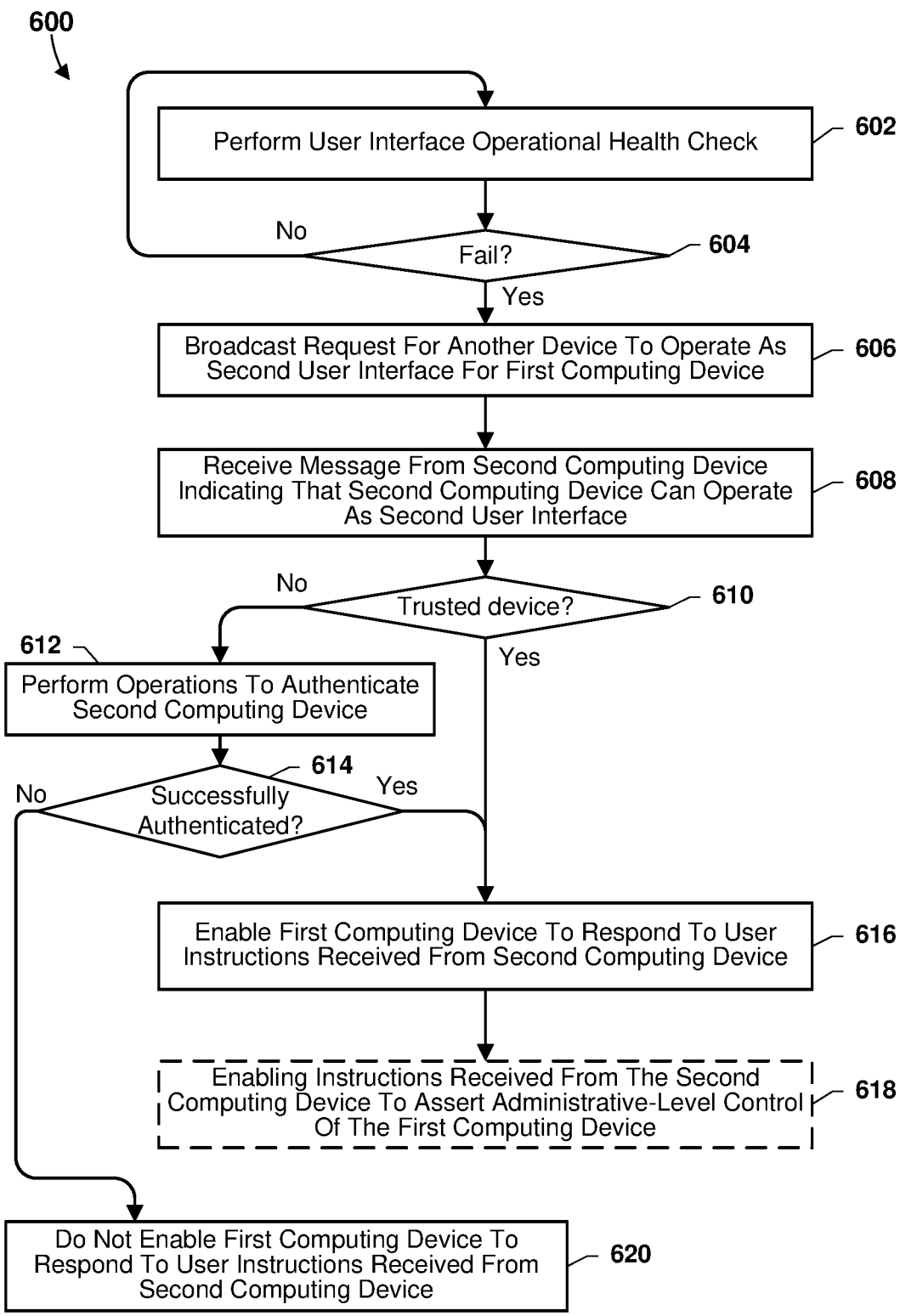
FIG. 6 is a process flow diagram illustrating an example method that may be performed by a processing device of a computing device for controlling another computing device with an inoperable user interface in accordance with various embodiments.

FIG. 6 is a process flow diagram illustrating another example method 600 that may be performed by a processing device of a computing device (first computing device) with an inoperable user interface for responding to (receiving and executing) user instructions from a another computing device (with in accordance with various embodiments. With reference to FIGS. 1-6, means for performing each of the operations of the method 600 may include a processor (e.g., 202, 204, 210, 212, 214, 216, 218, 260, 410) of the computing device (e.g., 102), referred to herein a "processor." In some embodiments, the processor may perform the operations of the method 600 in an operational context in which the computing device (a first computing device) has established a communication link with a distributed context network.

In block 602, the processor may perform a user interface operational health check of a user interface of the first computing device. For example, the processor may determine whether all functions of the user interface are operational or providing input signals that are consistent with normal functionality.

In determination block 604, the processor may determine whether the user interface fails the operational health check.

In response to determining that the user interface does not fail (i.e., passes) the operational health check (i.e., determination block 604="No"), the processor may again perform the user interface operational health check from time to time.

In response to determining that the user interface fails the operational health check (i.e., determination block 604="Yes"), the processor may broadcast a request for another computing device to operate as a second user interface for the first computing device in block 606. In some embodiments, the processor may broadcast the request to one or more other computing devices participating in or in communication with the distributed context network.

In block 608, the processor may receive a message from a second computing device indicating that the second computing device can operate as a second or substitute user interface for the first computing device. The second computing device may be one of the computing devices participating in or in communication with the distributed context network.

In determination block 610, the processor may determine whether the second computing device is a trusted computing device. In some embodiments, the first computing device may have stored in memory an indication that the second computing device is a trusted computing device. In some embodiments, the first computing device may determine that the second computing device is a trusted device by virtue of the second computing device participating in the distributed context network. For example, the second computing device may already have passed an authentication check when joining in or participating in the distributed context network.

In response to determining that the second computing device is not a trusted computing device (i.e., determination block 610="No"), the processor may perform operations to authenticate the second computing device in block 612.

In determination block 614, the processor may determine whether the second computing device has been successfully authenticated.

In response to determining that the second computing device has not been successfully authenticated (i.e., determination block 614="No"), the processor may not enable the first computing device to respond to user instructions received from the second computing device in block 620.

In response to determining that the second computing device has been successfully authenticated (i.e., determination block 614="Yes"), or in response to determining that the second computing device is a trusted computing device (i.e., determination block 610="Yes"), the processor may enable the first computing device to respond to user instructions received from the second computing device in block 616.

In optional block 618, the processor may enable instructions received from the second computing device to assert administrative-level control of the first computing device. In some embodiments, the message received from the second computing device may include a pairing request, and the processor may automatically accept the pairing request in response to determining that the second computing device is a trusted computing device. In some embodiments, the processor may automatically accept the pairing request in response to determining that the first computing device is connected to a known network, such as a network designated as a home network, a trusted network, or the like. In some embodiments, if the first computing device is not connected to a trusted network, the processor may require a security operation before authorizing access by the second computing device. In some embodiments, enabling the first computing device to respond to instructions received from the second computing device may include the processor providing administrative-level access by the second computing device to functions of the first computing device. In some embodiments, the processor may grant (process, handle) priority to the administrative-level access by the second computing device over other processes executing in the first computing device. In some embodiments, the processor may set the administrative-level access by the second computing device as a priority rule in a data structure in memory.

Implementation examples are described in the following paragraphs. While some of the following implementation examples are described in terms of example methods, further example implementations may include: the example methods discussed in the following paragraphs implemented by a computing device comprising a processor configured with processor-executable instructions to perform operations of the methods of the following implementation examples; the example methods discussed in the following paragraphs implemented by a computing device comprising means for performing functions of the methods of the following implementation examples; and the example methods discussed in the following paragraphs may be implemented as a non-transitory processor-readable storage medium having stored thereon processor-executable instructions configured to cause a processor of a computing device to perform the operations of the methods of the following implementation examples.

Example 1. A method of controlling a first computing device with an inoperable user interface, including broadcasting, by the first computing device, a request for another computing device to operate as a second user interface for the first computing device in response to determining that a first user interface of the first computing device is inoperable to control an operation of the first computing device, receiving from a second computing device a message indicating that the second computing device can operate as the second user interface for the first computing device, and enabling the first computing device to respond to user instructions received from the second computing device.

Example 2. The method of example 1, in which enabling the first computing device to respond to user instructions received from the second computing device includes transmitting to the second computing device information configured to be displayed by the second user interface of the second computing device, and performing an operation in response to receiving an input from the second computing device.

Example 3. The method of either of examples 1 or 2, further including determining that the first user interface is inoperable in response to the first user interface failing an operational health check.

Example 4. The method of any of examples 1-3, further including performing an operation to authenticate the second computing device as a trusted device in response to receiving the message indicating that the second computing device can operate as the second user interface for the first computing device, in which enabling the second computing device to operate as a second user interface for the first computing device is performed in response to successfully authenticating the second computing device as a trusted device.

Example 5. The method of example 4, in which performing an operation to authenticate the second computing device as a trusted device includes determining whether an indication that the second computing device is a trusted device is stored in a memory of the first computing device.

Example 6. The method of example 4, in which performing an operation to authenticate the second computing device in response to receiving the authentication request includes transmitting to the second computing device an authentication information request, receiving from the second computing device authentication information responsive to the authentication information request, and using the received authentication information to perform the operation to authenticate the second computing device.

Example 7. The method of any of examples 1-6, in which enabling the first computing device to respond to user instructions received from the second computing device includes enabling instructions received from the second computing device to assert administrative-level control of the first computing device.

Example 8. The method of example 7, in which enabling instructions received from the second computing device to assert administrative-level control of the first computing device includes setting administrative-level access by the second computing device as a priority rule in a data structure in memory.

Example 8. The method of any of examples 1-8, in which the first computing device and the second computing device are network elements of a distributed context network.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method of controlling a first computing device with an inoperable user interface, comprising:
   broadcasting, by the first computing device, a request for another device to operate as a second user interface for the first computing device in response to determining that a first user interface of the first computing device is inoperable to control an operation of the first computing device;
   receiving from a second computing device a message indicating that the second computing device can operate as the second user interface for the first computing device; and
   enabling the first computing device to respond to user instructions received from the second computing device, wherein enabling the first computing device to respond to user instructions received from the second computing device comprises enabling instructions received from the second computing device to assert administrative-level control of the first computing device.

2. The method of claim 1, wherein enabling the first computing device to respond to user instructions received from the second computing device comprises:
   transmitting to the second computing device information configured to be displayed by the second user interface of the second computing device; and
   performing an operation in response to receiving an input from the second computing device.

3. The method of claim 1, further comprising determining that the first user interface is inoperable in response to the first user interface failing an operational health check.

4. The method of claim 1, further comprising:
   performing an operation to authenticate the second computing device as a trusted device in response to receiving the message indicating that the second computing device can operate as the second user interface for the first computing device,
   wherein enabling the second computing device to operate as a second user interface for the first computing device is performed in response to successfully authenticating the second computing device as a trusted device.

5. The method of claim 4, wherein performing an operation to authenticate the second computing device as a trusted device comprises determining whether an indication that the second computing device is a trusted device is stored in a memory of the first computing device.

6. The method of claim 4, wherein performing an operation to authenticate the second computing device in response to receiving the authentication request comprises:
   transmitting to the second computing device an authentication information request;
   receiving from the second computing device authentication information responsive to the authentication information request; and
   using the received authentication information to perform the operation to authenticate the second computing device.

7. The method of claim 1, wherein enabling instructions received from the second computing device to assert administrative-level control of the first computing device comprises setting administrative-level access by the second computing device as a priority rule in a data structure in memory.

8. The method of claim 1, wherein the first computing device and the second computing device are network elements of a distributed context network.

9. A computing device, comprising:
a processor configured with processor-executable instructions to:
broadcast a request for an other computing device to operate as a substitute user interface for the computing device in response to determining that a user interface of the computing device is inoperable to control an operation of the computing device;
receive from the other computing device a message indicating that the other computing device can operate as a substitute user interface for the computing device; and
enable the computing device to respond to user instructions received from the other computing device, wherein to enable the computing device to respond to user instructions received from the other computing device, the processor is further configured with processor-executable instructions to enable instructions received from the other computing device to assert administrative-level control of the computing device.

10. The computing device of claim 9, the processor is further configured with processor-executable instructions to:
transmit to the other computing device information configured to be displayed by the substitute user interface of the other computing device; and
perform an operation in response to receiving an input from the other computing device.

11. The computing device of claim 9, the processor is further configured with processor-executable instructions to determine that the user interface is inoperable in response to the user interface failing an operational health check.

12. The computing device of claim 9, wherein the processor is further configured with processor-executable instructions to:
perform an operation to authenticate the other computing device as a trusted device in response to receiving the message indicating that the other computing device can operate as the substitute user interface for the computing device; and
enable the other computing device to operate as a substitute user interface for the computing device in response to successfully authenticating the other computing device as a trusted device.

13. The computing device of claim 12, wherein the processor is further configured with processor-executable instructions to determine whether an indication that the other computing device is a trusted device is stored in a memory of the computing device.

14. The computing device of claim 12, wherein the processor is further configured with processor-executable instructions to:
transmit to the other computing device an authentication information request;
receive from the other computing device authentication information responsive to the authentication information request; and
use the received authentication information to perform the operation to authenticate the other computing device.

15. The computing device of claim 9, wherein to enable instructions received from the other computing device to assert administrative-level control of the computing device, the processor is further configured with processor-executable to set administrative-level access by the other computing device as a priority rule in a data structure in memory.

16. A computing device, comprising:
means for broadcasting a request for an other computing device to operate as a substitute user interface for the computing device in response to determining that a user interface of the computing device is inoperable to control an operation of the computing device;
means for receiving from another computing device a message indicating that the other computing device can operate as the substitute user interface for the computing device; and
means for enabling the computing device to respond to user instructions received from the other computing device, wherein means for enabling the computing device to respond to user instructions received from the other computing device comprises means for enabling instructions received from the other computing device to assert administrative-level control of the computing device.

17. The computing device of claim 16, wherein means for enabling the computing device to respond to user instructions received from the other computing device comprises:
means for transmitting to the other computing device information configured to be displayed by the substitute user interface of the other computing device; and
means for performing an operation in response to receiving an input from the other computing device.

18. The computing device of claim 16, further comprising means for determining that the user interface is inoperable in response to the user interface failing an operational health check.

19. The computing device of claim 16, further comprising:
means for performing an operation to authenticate the other computing device as a trusted device in response to receiving the message indicating that the other computing device can operate as the substitute user interface for the computing device; and
means for enabling the other computing device to operate as a substitute user interface for the computing device in response to successfully authenticating the other computing device as a trusted device.

20. The computing device of claim 19, wherein means for performing an operation to authenticate the other computing device as a trusted device comprises means for determining whether an indication that the other computing device is a trusted device is stored in a memory of the computing device.

21. The computing device of claim 19, wherein means for performing an operation to authenticate the other computing device in response to receiving the authentication request comprises:
means for transmitting to the other computing device an authentication information request;
means for receiving from the other computing device authentication information responsive to the authentication information request; and
means for using the received authentication information to perform the operation to authenticate the other computing device.

22. The computing device of claim 16, wherein means for enabling instructions received from the other computing device to assert administrative-level control of the computing device comprises means for setting administrative-level access by the other computing device as a priority rule in a data structure in memory.

23. A non-transitory processor-readable medium having stored thereon processor-executable instructions configured to cause a processing device in a computing device to perform operations comprising:
- broadcasting, a request for an other device to operate as a substitute user interface for the computing device in response to determining that a user interface of the computing device is inoperable to control an operation of the computing device;
- receiving from the other computing device a message indicating that the other computing device can operate as the substitute user interface for the computing device; and
- enabling the computing device to respond to user instructions received from the other computing device, wherein enabling the first computing device to respond to user instructions received from the second computing device comprises enabling instructions received from the second computing device to assert administrative-level control of the first computing device.

24. The non-transitory processor-readable medium of claim 23, wherein the stored processor-executable instructions are further configured to cause the processing device in the computing device to perform operations such that enabling the other computing device to respond to user instructions received from the other computing device comprises:
- transmitting to the other computing device information configured to be displayed by the substitute user interface of the other computing device; and
- performing an operation in response to receiving an input from the other computing device.

25. The non-transitory processor-readable medium of claim 23, wherein the stored processor-executable instructions are further configured to cause the processing device in the computing device to perform operations further comprising determining that the user interface is inoperable in response to the user interface failing an operational health check.

26. The non-transitory processor-readable medium of claim 23, wherein the stored processor-executable instructions are further configured to cause the processing device in the computing device to perform operations further comprising:
- performing an operation to authenticate the other computing device as a trusted device in response to receiving the message indicating that the other computing device can operate as the substitute user interface for the computing device,
- wherein enabling the other computing device to operate as the substitute user interface for the computing device is performed in response to successfully authenticating the other computing device as a trusted device.

27. The non-transitory processor-readable medium of claim 26, wherein the stored processor-executable instructions are further configured to cause the processing device in the computing device to perform operations such that performing an operation to authenticate the other computing device as a trusted device comprises determining whether an indication that the other computing device is a trusted device is stored in a memory of the computing device.

28. The non-transitory processor-readable medium of claim 26, wherein the stored processor-executable instructions are further configured to cause the processing device in the computing device to perform operations such that performing an operation to authenticate the other computing device in response to receiving the authentication request comprises:
- transmitting to the other computing device an authentication information request;
- receiving from the other computing device authentication information responsive to the authentication information request; and
- using the received authentication information to perform the operation to authenticate the other computing device.

29. The non-transitory processor-readable medium of claim 26, wherein to enable instructions received from the other computing device to assert administrative-level control of the computing device, the stored processor-executable instructions are further configured to cause the processing device in the computing device to set administrative-level access by the other computing device as a priority rule in a data structure in memory.

* * * * *